(12) United States Patent
Mak

(10) Patent No.: US 7,192,000 B2
(45) Date of Patent: Mar. 20, 2007

(54) PLASTICS MOULDING

(75) Inventor: Shu-Keung Mak, Hong Kong (HK)

(73) Assignee: Dragon Models Limited, Hong Kong (HK)

( * ) Notice: Subject to any disclaimer, the term of this patent is extended or adjusted under 35 U.S.C. 154(b) by 0 days.

(21) Appl. No.: 11/121,482

(22) Filed: May 4, 2005

(65) Prior Publication Data

US 2005/0247853 A1 Nov. 10, 2005

(30) Foreign Application Priority Data

May 7, 2004 (HK) .................................. 04103215

(51) Int. Cl.
*B41B 11/54* (2006.01)
(52) U.S. Cl. ...................... 249/160; 249/134; 249/112; 249/113; 249/144; 425/DIG. 57; 425/190; 425/318
(58) Field of Classification Search ................ 425/552, 425/190, DIG. 57, 318; 249/134, 102, 104, 249/160, 112, 113, 144
See application file for complete search history.

(56) References Cited

U.S. PATENT DOCUMENTS 3,861,640 A * 1/1975 Agneta ........................ 249/102
5,597,593 A * 1/1997 Lebensfeld et al. ......... 425/441
6,171,093 B1 * 1/2001 Hawkinson .............. 425/174.4

OTHER PUBLICATIONS

Battlefront Miniatures Limited, "Flames of War", copyright 2002, website, pp. 1-8.*
Battlefront Miniatures Limited, "Flames of War", copyright 2002, website, pp. 1-7.*

* cited by examiner

*Primary Examiner*—Yogendra Gupta
*Assistant Examiner*—Maria Veronica D. Ewald
(74) *Attorney, Agent, or Firm*—Alix, Yale & Rista, LLP

(57) ABSTRACT

A die for moulding a plastics part includes a cavity defining an overall shape of the part and having a surface-textured insert for providing an area upon the moulded plastics part having intricate surface detail.

6 Claims, 4 Drawing Sheets

(PRIOR ART) FIG. 1

PLASTICS MOULDING

BACKGROUND OF THE INVENTION

The present invention relates to plastics moulding. More particularly, although not exclusively, the invention relates to a technique for achieving intricate surface detail in parts of a moulded plastics scale model kit.

Plastics model kits have been known for many years to comprise a "skeleton" of numbered parts to be individually removed to be glued together in accordance with an instruction sheet to form a scale model. Similar skeletons of parts are also provided for purposes other than assembling plastics models—such as for example in the provision of multiple small finished parts like toy figures or components used in other fields.

The known technique of forming such a skeleton of parts is to provide a pair of opposed dies which cooperate to define flow tracks and a plurality of cavities into which the plastics material flows from the flow tracks. The material from which the dies are made is limited in its ability to provide intricate surface detail on the finished parts where desired. For example a gun turret of a scale model army tank would be more realistic if it had intricate surface detail mimicking in fine detail the surface features of a full-scale gun turret. Such detail in the scale model might be very fine and only really properly visible with the assistance of a magnifying glass. The inverse of such detail is not possible to achieve in the dies of the known moulding technique.

OBJECT OF THE INVENTION

It is the object of the present invention to overcome or substantially ameliorate the above disadvantage and/or more generally to provide an improved technique of moulding plastics parts having intricate surface detail.

DISCLOSURE OF THE INVENTION

There is disclosed herein a die for moulding a plastics part, the die comprising a cavity defining an overall shape of the part and having a surface-textured insert for providing an area upon the moulded plastics part having intricate surface detail.

Preferably, the die comprises a recess extending from the cavity and into which the insert is fitted.

Preferably, the recess comprises a step and the insert comprises a corresponding step and wherein the steps abut one another to position the area of intricate surface detail as desired.

Preferably, the insert is made of a high-quality material and wherein the surface texture is machined or etched thereon.

Preferably, the die comprises a plurality of said recesses, each extending from the cavity.

Preferably, the die is an outer die for use in combination with an inner die having parts protruding into the cavity.

Preferably, the insert is made of a material other than that from which the die is fabricated.

Preferably the intricate surface detail gives the appearance of an applied Zimmerit paste in a scale model World War II German army tank.

BRIEF DESCRIPTION OF THE DRAWINGS

A preferred form of the present invention will now be described by way of example with reference to the accompanying drawings, wherein.

DESCRIPTION OF THE PREFERRED EMBODIMENT

Figure 1:
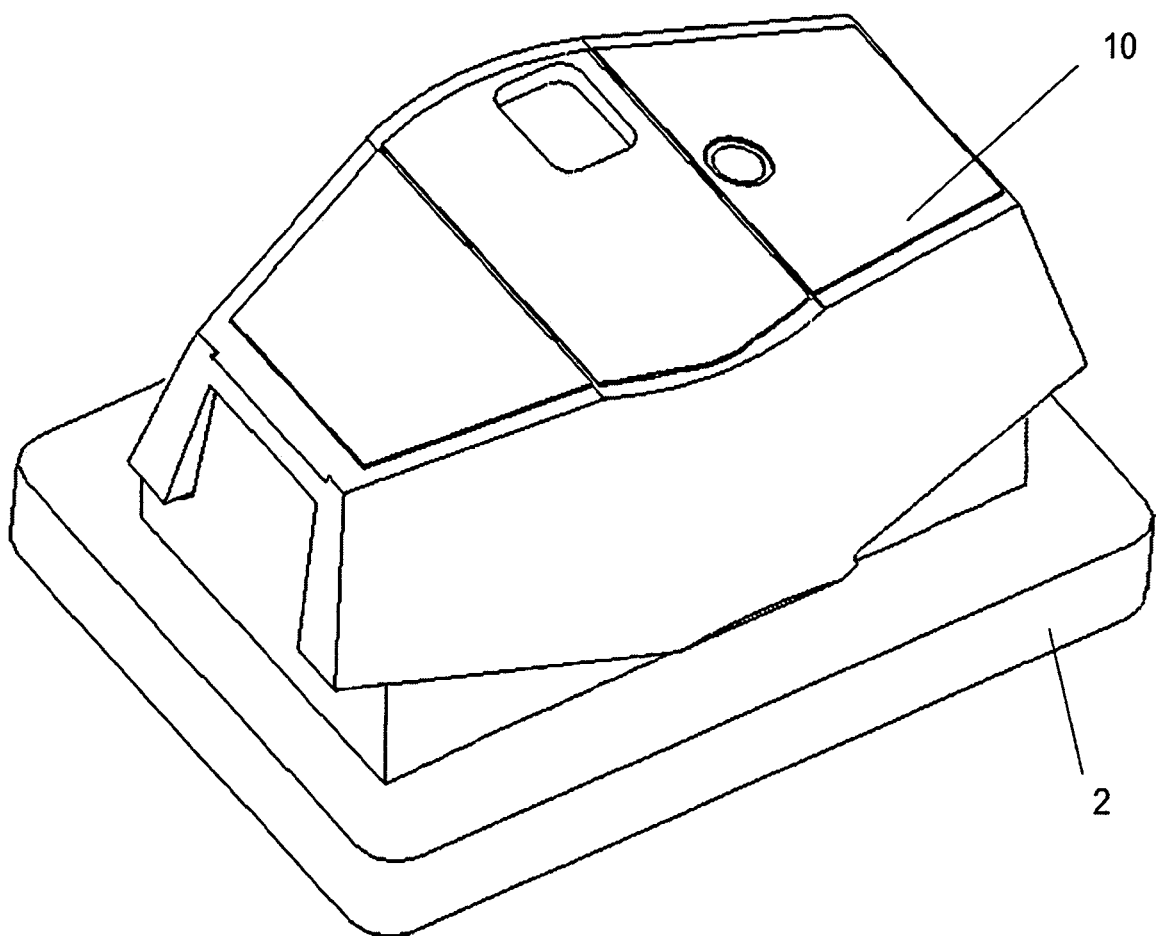
FIG. 1 is a schematic perspective illustration of a prior art moulded plastics scale model army tank turret sitting upon an inner die and displaying a typically low level of surface detail.

FIG. 1 of the accompanying drawings depicts schematically a prior art plastics scale model army tank turret 10 sitting upon an inner die 2. The inner die 2 provides no relevant surface detail as it merely defines the basic inner hollow shape of the turret 10. The outer surface of the turret 10 shows surface detail of low-level intricacy.

Figure 2:
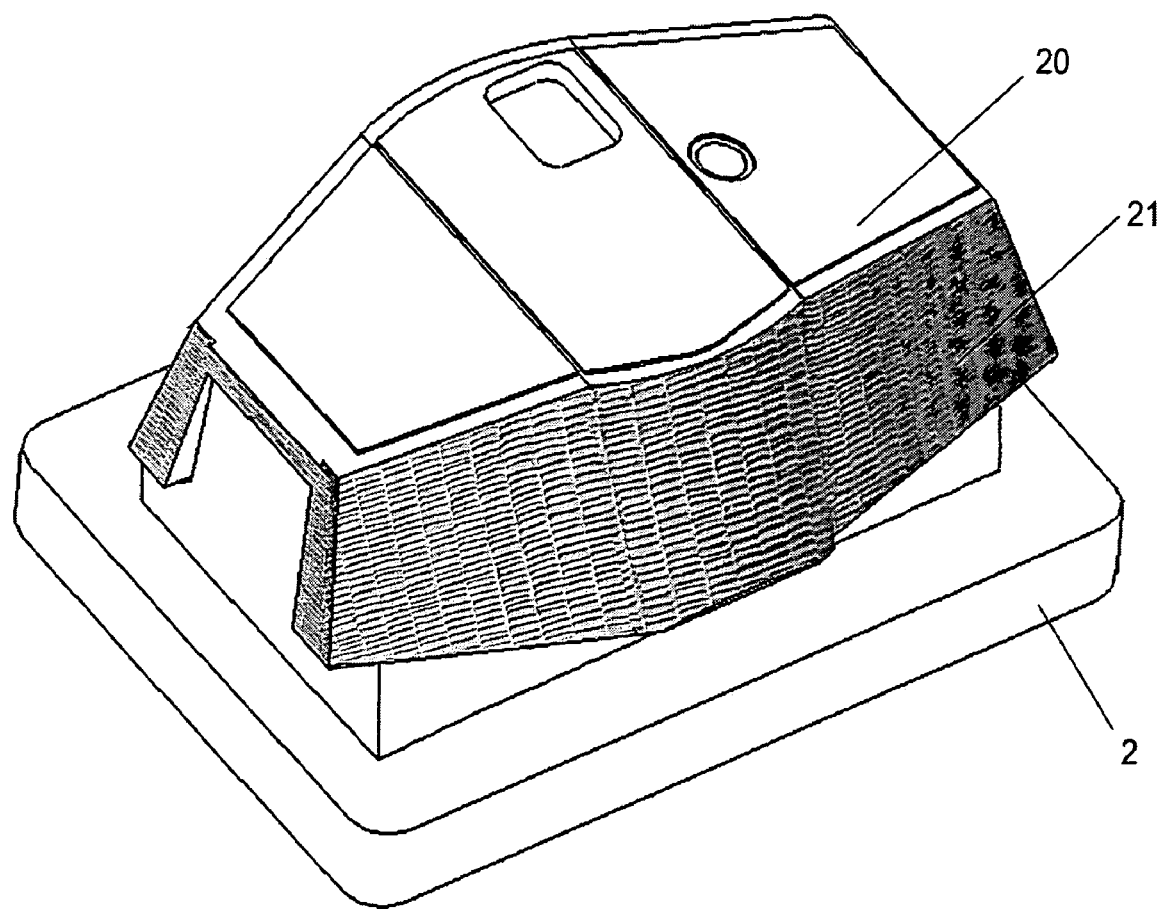
FIG. 2 is a schematic perspective illustration of a moulded plastics scale model army tank turret sitting upon an inner die and displaying areas of intricate surface detail on its outer surface as provided herein.

FIG. 2 depicts schematically a plastics scale model World War II German army tank turret 20 sitting upon an inner die 2. The inner die 2 is for all intents and purposes the same as that depicted in FIG. 1. The outer surface of the turret 20 shows areas 21 of intricate surface detail as provided herein and mimicking the full-scale army tank turret's "Zimmerit paste" anti-mine, camouflage detail. In 1943, the German chemical company Zimmer produced a combination of materials including barium sulphate, polyvinyl acetate, ochre pigment, saw dust and zinc sulphide. This would create a paste that would, when spread over a ferrous surface, prevent explosive mines from adhering magnetically to the tank. The areas of intricate surface detail mimic this paste in the preferred embodiment.

Figure 3:
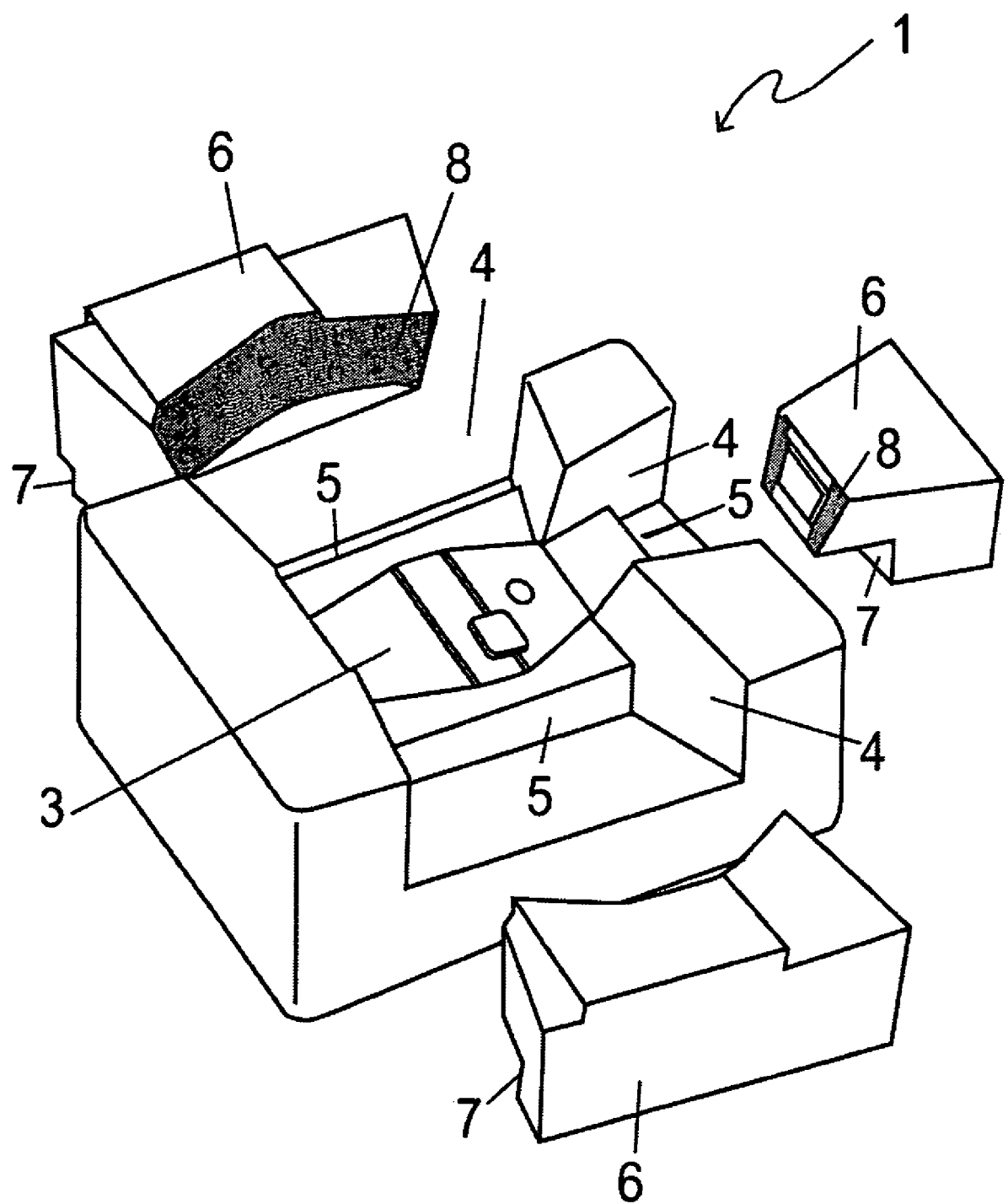
FIG. 3 is a schematic parts-exploded inverted perspective illustration of an outer die used in forming the scale model army tank turret as illustrated in FIG. 2.
Figure 4:
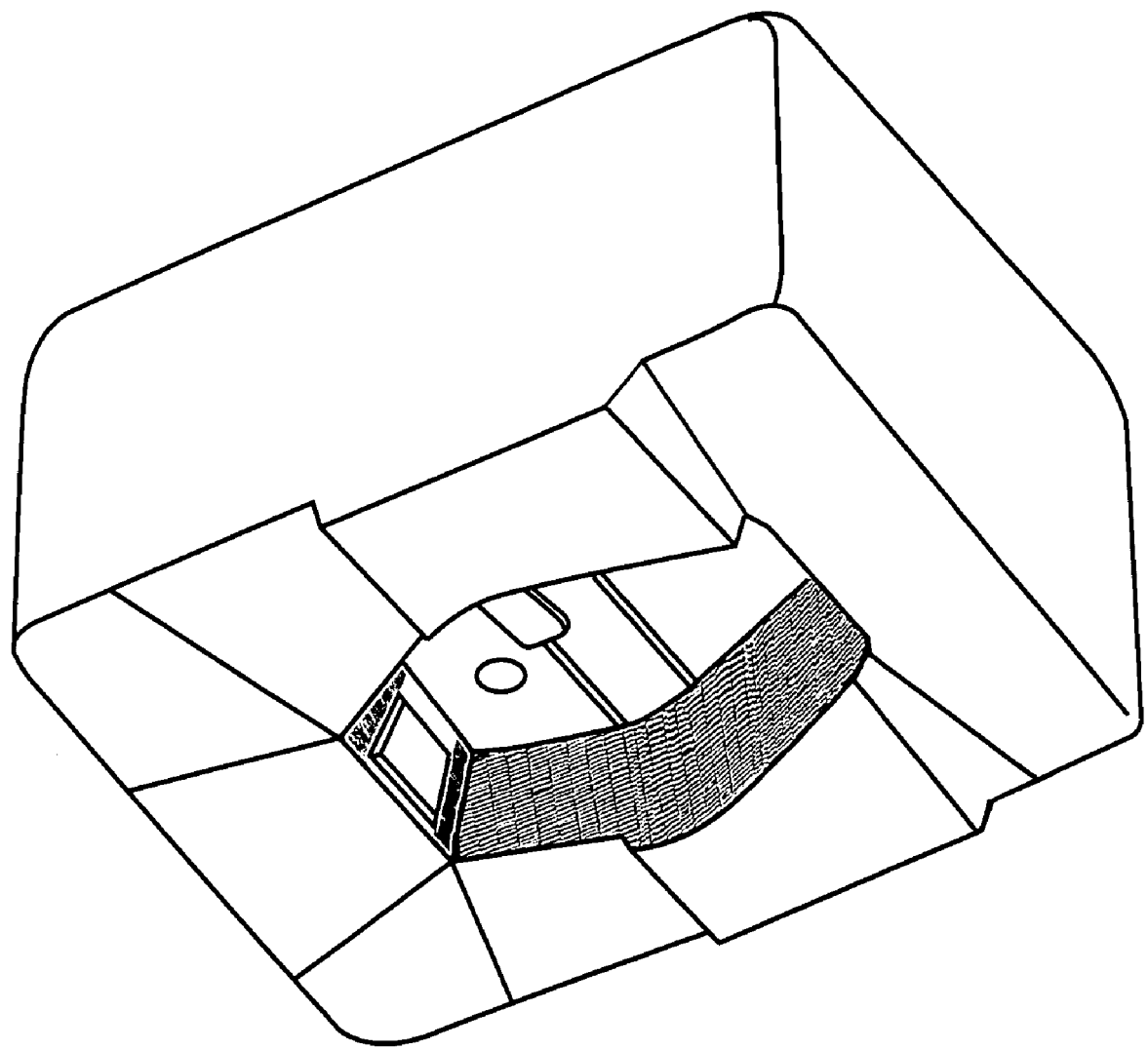
FIG. 4 is a schematic partly cut-away perspective illustration of the moulded plastics turret of FIG. 2 within the outer die of FIG. 3.

FIG. 3 of the accompanying drawings depicts schematically an outer die 1. The inner and outer dies are made of a material well-known in the art of plastics moulding. There would be plastics flow tracks extending between the dies 1 and 2 by which molten plastics material can flow under heat and pressure to a cavity defined between the dies when they are brought substantially together to define a space equivalent to the finished part-thickness therebetween.

The outer die 1 defines a main cavity 3 from which there extends a number of recesses 4. Each recess 4 comprises a step 5 extending thereacross as depicted. Each recess 4 receives an insert 6 also having a step 7 that bears against the respective step 5 to define the correct fixed position of the respective insert upon the die. Each insert has an area 8 of intricate surface detail facing inwardly to the main cavity 3. The intricate surface detail is hand-engraved, machined, chemical-etched, laser-etched or otherwise formed upon the areas 8 of the respective inserts 6. The inserts are typically made of non-ferrous metal, ceramic or other high-quality material capable of being intricately machined or otherwise textured on its surface without degradation over time as might occur by corrosion in ferrous metals for example. The inserts can be affixed within the respective recess 4 by tight interference fit, adhesive or other means such as screws.

The overall mould would typically comprise a vast number of dies including cavities 4 all interconnected by a skeleton of flow tracks. The plastics material that flows through such tracks would form the skeleton from which the plastics parts are later removed by the model maker.

It should be appreciated that modifications and alterations obvious to those skilled in the art are not to be considered as beyond the scope of the present invention. For example, the inner die part might also include textured inserts, depending upon the nature of the part to be formed.

The invention claimed is:

1. A die for moulding a plastics part, the die fabricated in a first material and comprising a cavity for receiving molten plastics material and defining an overall shape of the part formed when the plastics material sets in the cavity and defining a recess extending from the cavity and having an insert fitted into the recess and fabricated in a second material different from the first material and with an intricately surface-textured area for providing an area upon the moulded plastics part having intricate surface detail.

2. The die of claim 1 wherein the recess comprises a step and the insert comprises a corresponding step and wherein the steps abut one another to position the area of intricate surface detail as desired.

3. The die of claim 1, wherein the second material is of high quality and wherein the surface texture is machined or etched thereon.

4. The die of claim 1 comprising a plurality of said recesses, each extending from the cavity.

5. The die of claim 1 being an outer die for use in combination with an inner die having parts protruding into the cavity.

6. The die of claim 1, wherein the intricate surface detail gives the appearance of an applied Zimmerit paste in a scale model World War II German army tank.

\* \* \* \* \*